United States Patent [19]

Schiel

[11] Patent Number: 5,291,826
[45] Date of Patent: Mar. 8, 1994

[54] TENSION BARS FOR ROLL PRESS FOR PAPER MAKING MACHINE

[75] Inventor: Christian Schiel, Heidenheim, Fed. Rep. of Germany

[73] Assignee: J. M. Voith GmbH, Fed. Rep. of Germany

[21] Appl. No.: 946,325

[22] PCT Filed: Mar. 26, 1992

[86] PCT No.: PCT/EP92/00672

§ 371 Date: Nov. 6, 1992

§ 102(e) Date: Nov. 6, 1992

[30] Foreign Application Priority Data

Mar. 28, 1991 [DE] Fed. Rep. of Germany ....... 4110205

[51] Int. Cl.$^5$ ............................................. B30B 3/04
[52] U.S. Cl. ..................... 100/168; 72/237; 72/245; 100/153; 100/162 B; 162/272; 162/358.3; 267/74
[58] Field of Search ............... 100/151–154, 100/168–171, 162 B; 72/237, 245; 162/272, 273, 358.3, 360.2, 360.3; 267/69, 73, 74, 158, 160

[56] References Cited

U.S. PATENT DOCUMENTS

| | | | |
|---|---|---|---|
| 1,228,178 | 5/1917 | Brooker | 100/171 |
| 2,751,262 | 6/1956 | Federn et al. | 267/160 X |
| 3,097,591 | 7/1963 | Justus | 100/162 B X |
| 3,207,062 | 9/1965 | Van Hartesveldt et al. | 100/154 X |
| 3,648,599 | 3/1972 | Rinberger | 100/169 |
| 3,659,450 | 5/1972 | Metzger | 72/245 X |
| 3,896,719 | 7/1975 | Goodall et al. | 100/169 |
| 3,921,514 | 11/1975 | Biondetti | 100/162 B |
| 3,946,587 | 3/1976 | Maltby | 72/237 |
| 4,272,317 | 6/1981 | Roerig | 100/168 X |
| 4,423,612 | 1/1984 | Uppaluri | 72/237 X |
| 4,503,765 | 3/1985 | Schiel | 100/153 X |
| 4,973,384 | 11/1990 | Crouse et al. | 162/358.3 X |
| 5,062,656 | 11/1991 | Hynds et al. | 267/160 X |

FOREIGN PATENT DOCUMENTS

| | | |
|---|---|---|
| 0328844 | 8/1989 | European Pat. Off. |
| 2904763 | 8/1980 | Fed. Rep. of Germany ...... 100/169 |
| 8232424 | 10/1985 | Fed. Rep. of Germany . |
| 1030295 | 5/9158 | Fed. Rep. of Germany ...... 100/169 |
| 6814378 | 10/1969 | Netherlands . |

Primary Examiner—Stephen F. Gerrity
Attorney, Agent, or Firm—Ostrolenk, Faber, Gerb & Soffen

[57] ABSTRACT

The axes of a first press roll (1) and of a second press roll (3) lie in a press plane (E). Each of the press rolls has a journal pin (2) and (4) respectively. The first press roll is supported in a first bearing pedestal (5). The second press roll rests in a second bearing pedestal (6) which is coupled to the first bearing pedestal (5) by utilizing flexurally soft tension bars (7, 8). In the unloaded condition of the roll press, the second bearing pedestal (6) rests on the first bearing pedestal (5). In the loaded condition, play (p) is established between the bearing pedestals (5 and 6) so that the bearing pedestals (5 and 6) are displaceable axially relative to each other.

34 Claims, 6 Drawing Sheets

TENSION BARS FOR ROLL PRESS FOR PAPER MAKING MACHINE

BACKGROUND OF THE INVENTION

The present invention relates to a roll press having a first press roll and a second press roll the principal axes of which lie in a press plane and which form a press nip with each other. The invention proceeds from a roll press having a first press roll and a second press roll which cooperate to form a press nip. The principal axes of both of the press rolls lie in a press plane. Each press roll has a rotatable shell. There are journal pins at both ends of the press rolls. Either a rotatable shell has a rotatable journal pin or a stationary support extends through the roll shell and has stationary journal pins. Both of the press rolls are supported at their journal pins on a respective bearing pedestal for the journal pin. At least one bearing pedestal at one end of one of the press rolls is coupled to the other bearing pedestal at the same end of the press rolls by at least one and more usually by two detachable tension bars. The two tension bars are located at both sides of the press plane, extend substantially parallel to that plane and extend in a direction perpendicular to the principal axes of the press rolls. These features of a press roll are known from U.S. Pat. No. 3,921,514.

In one embodiment of the known roll press, the first press roll is located in the lower position and the second press roll in the upper position. Thus, the bearing pedestals of the first press roll are on a stand, foundation or the like. From U.S. Pat. No. '514, however, the reverse arrangement is also known, in which the bearing pedestals of the first (in this case upper) press roll are suspended from the bottom of a stand. The invention concerns both arrangements. Furthermore, the known roll press is developed in the manner that the bearing pedestals in which the second press roll rests are rigidly attached to the bearing pedestals of the first press roll by tension bars. Said tension bars are developed as screws and, in loaded condition of the roll press, must transmit high tensile forces which result from the pressing force prevailing in the press nip. It must be borne in mind in this connection that such press rolls are used preferably in paper manufacturing machines, the width of which may in extreme cases amount to up to 10 m. Furthermore, certain roll presses (for instance in accordance with U.S. Pat. No. 4,503,765 are developed as shoe presses in which the linear force prevailing in the press nip may reach an order of magnitude of 1000 kN/m.

To be sure, in the case of the object of U.S. Pat. No. '514 the pressing forces are kept away from the machine stand so that the latter must bear at most the weight of the roll press itself. However, there is the problem that said screw connections become extremely bulky and expensive. Furthermore, the screws must be under a considerable initial stress, which, according to U.S. Pat. No. '514, must be greater than the maximum pressing force. In other words: the screws are strongly stressed even in the unloaded condition of the roll press. Therefore, the mounting of the screws can be effected only at enormous expense.

Upon the use of the known roll press in the press end of a paper manufacturing machine, there is the further complication that at least one endless felt belt must pass through the press nip and that such felt belt must be replaced at regular intervals by a new felt belt. For this purpose, it is necessary each time to loosen the said screw connections and then priestess them again after the new endless felt belt has been introduced. These are very cumbersome and time-consuming operations in view of the bulk of the screw connections and the high initial stressing of the screws required.

Another problem in connection with such roll presses is that in the case of each press roll at least one of the two journal pins must be displaceable in axial direction under the full operating load because of the thermally caused changes in length of the rotatable roll shell or the stationary support which at times take place. In the case of a turnable journal pin, therefore the outer ring of the antifriction bearing, for example, must be displaceable in the bearing housing. Or in the case of a stationary journal pin, it must be seen to it, for example, that this journal pin is axially displaceable in a sleeve (or bushing). In both cases, slide surfaces must be provided which are suitable for transmitting the immense press forces and at the same time permit the necessary axial displacement.

SUMMARY OF THE INVENTION

The object of the present invention is further to develop the known roll press so that at least on one of the two ends of the roll press, a rapid loosening and reestablishing of the coupling between the bearing pedestals of the two press rolls is possible and that, at the same time, the previously necessary slide surface for the axial displacement of the journal pin can be dispensed with at least in the second press roll.

The inventor has found that both problems can be solved by use of detachable tension bars which have little tension in the unloaded condition of the press rolls. The tension bars are movable essentially in the direction of their principal axes or directions of extension, such that in the loaded condition of the roll press, the bearing pedestal of one press roll is movable in the press plane relative to the other bearing pedestal. As another feature, as seen in a cross section across the roll axes, the distance generally in the radial direction, between the outer sides of the two tension bars on opposite sides of the press plane is substantially the same size or as or is smaller than the diameter of the larger one of the two press rolls. In accordance with this principle of solution, one now avoids—at least at the one end of the roll press over which a new endless felt belt is introduced upon change of the felt—the previously rigid coupling of the bearing pedestal of the second press roll to the bearing pedestal of the first press roll. This is because, in accordance with the invention, their tension bars are no longer developed as screw connections which are to be prestressed but are rather under little tension, i.e. at least substantially free of stress in the unloaded condition of the roll press so that they can be easily detached and just as easily mounted again, for instance upon the aforementioned replacement of the felt belt. Nevertheless, the tension bars can readily be so dimensioned that they can transmit the enormous tensile forces from one bearing pedestal to the other.

The expression "little tension" means that the tension bars, when the roll press is not under load, are slightly prestressed, for instance only by the weight of one of the press rolls itself or, for instance, by means of a spreading device. The following results from this: the loaded condition of the roll press is always characterized by the fact there is a distance (or "play") between the two bearing pedestals which are connected by the tension bars. As will be explained further below, there are various structural embodiments: in one of them, the said distance is established only by the loading of the roll press; in others, the distance is continuously present but is increased under the load. In all cases this distance—in cooperation with the further inventive feature pursuant to which the tension bars are movable—makes it possible for the two bearing pedestals to be movable relative to each other in the press plane, particularly in the direction of the principal axes. As a result of this, at least in the second press roll, the bearing pedestal can be rigidly coupled to the journal pin and nevertheless longitudinal elongation (for instance, caused by heat) is possible and furthermore an inclining of the journal pin, which can be caused by a sagging of the press roll. The aforementioned movability of the tension bars is to be understood in the sense that the tension bars are movable essentially in the direction of the principal axes of the press rolls, and therefore at least approximately parallel to the press plane. The movability of the tension bars could be assured by coupling them to the bearing pedestals by means of swing bearings. In accordance with the invention however, flexurally soft tension bars are preferred, as will be explained further below.

Another important aspect of the invention concerns the problem that, in many cases, one of the two press rolls is to be developed as a long-nip press roll. It may also happen that in the position, for instance, of the second press roll, a normal press roll with metal roll shell is to be arranged some of the time and a long-nip press roll with flexible press shell some of the time. Therefore, in accordance with a further concept of the invention, the tension bars are so arranged that the distance between the outsides of the tension bars is only at most very slightly greater if at all than the diameter of the larger of the two press rolls. By the use of this feature, it is possible to keep the outside dimensions of the bearing pedestals, seen in axial direction, so small that —after the removal of the tension bars—replacement of the flexible tubular roll shell of a long-nip press roll is possible without removing the corresponding bearing pedestal. It is important to employ this feature even when the roll press initially has two normal press rolls with metal roll shells. In this way, it can be converted at relatively little expense into a long-nip press.

From U.S. Pat. No. 4,272,317, a long-nip press device of a different type is already known in which a support for a press shoe and for the guide rolls of a revolving press belt is suspended by means of tension bars from stand parts arranged on top. The bearing pedestals for a press roll also are suspended from these stand parts. To be sure, the tension bars of this known press device are also loaded in the unloaded condition of the press device only by the weight of the support itself (including the parts fastened to it); these tension bars are also movable in the direction of the principal axes. Since, however, seen in axial direction, they lie outside the contour of the bearing pedestal of the press roll it is not possible to use this known arrangement in a two-roll press in which a press shell must be replaced in axial direction. It is therefore an essential feature of the invention that the tension bars are arranged at the smallest possible distance from the press plane and are coupled directly to the bearing pedestals.

In accordance with the invention, where the roll press is a long nip roll press having one long press nip, the bearing pedestals have arms which serve for the coupling of the tension bars and which—at least in the case of the bearing pedestal of the long-nip press roll— lie completely, or at least to the greatest part, within the contour of the roll shell when viewing the bearing pedestal in axial direction.

The features described above can be realized, in principle, with swingable tension bars, namely bars which are articulately connected to the bearing pedestals, the pivot pins lying perpendicular to the press plane. However, such a construction requires a large amount of space in axial direction when the tension bars must be brought into a position approximately parallel to the axis for the replacement of the felt belt or roll shell. In accordance with another important concept of the invention, it is therefore provided that each of the tension bars is flexurally soft in the direction of the press-roll principal axes. In this case, it is possible to provide a swing bearing at one end of each tension bar, the axis of said bearing being arranged parallel to the press plane or forming an acute angle with the press plane. In this way, the tension bar can be swung out laterally (into a position perpendicular or oblique to the press plane.)

Differing from this possible embodiment however, it is provided, in accordance with the invention, that each of the flexurally soft tension bars has the shape of an I; it therefore has at each of its two ends a rigid "head", preferably a hammer head. In the loaded condition of the roll press these heads are seated immovably in the bearing pedestals so that the relative movability of the two bearing pedestals with respect to each other is possible solely on basis of the flexural softness of the tension bars. This inventive concept is reduced to practice most simply in the manner that the individual tension bar is developed in the manner of a leaf spring the "leaf plane" of which is substantially perpendicular to the press plane. In this way it is seen to it that the tension bar is flexurally soft solely in a plane parallel to the press plane; in other words, the flexibility of the tension bar parallel to the press plane is several times greater than perpendicular to the press plane.

Tension bars of the type described can also be used in press devices of other type or, for instance, in rolling mills, calendars, or the like.

The installation and removal of the tension bars is preferably effected by a linear movement of the tension bars in a direction perpendicular to the press plane. The tension bars can therefore be inserted into recesses in the bearing pedestals from the side. The individual tension bar can for this purpose have a transverse hole into which a bolt supported on the machine stand extends. This is advantageous, in particular, when the press plane is arranged vertically and the bolt thus extends in a horizontal direction.

The tension bars must, on the one hand, have a certain minimum length in order to be sufficiently flexurally soft. On the other hand, they should not be too long, so that they take up as little space as possible. One particularly favorable arrangement has the tension bars each having a length of at least 0.5 meters, and preferably a length in the range of 0.7 to 1.5 meters. One end of each tension bar is coupled, at a location close to the central plane of the long nip press roll and also perpendicular to the press plane, to the bearing pedestal of the long nip press roll. The other end of each tension bar, which is close to the press nip plane, is also perpendicular to the press plane, and extends through the press nip, is coupled to the bearing pedestal of the other press roll. For ease of installation and removal of each of the tension bars in their respective pedestals at one end of the roll press, a slot is provided in each of the bearing pedestals for sliding the tension bars in and out of the pedestals. A simple slot may be provided in the bearing pedestal of the long nip press roll and a T-shaped groove may be provided in the bearing pedestal of the other press roll.

It is obvious that the width of the tension bars, measured perpendicular to the press plane, is dependent on the amount of the tensile force to be transmitted and thus primarily on the width of the machine and therefore on the length of the press nip. In order that the tension bars can be removed and installed even in the case of a very large width of the tension bar as far as possible without the use of a lift or hoisting device, it may be advantageous to divide the individual tension bar into several individual tension bars over its width. Thus, the expression "tension bar" is to be understood in such a way that either an individual tension bar or a group of tension bars is meant.

The invention differs fundamentally from the aforementioned known roll press described in U.S. Pat. No. 4,503,765. In that case, a frame-shaped stand is provided, the one bearing pedestal being fastened to a lower part of the stand and the other bearing pedestal to an upper part of the stand. Since there is no direct coupling between the support element and the bearing pedestals, it is necessary here for detachable connecting elements which transmit the tensile forces resulting from the pressing force to be provided between the two parts of the stand. Here, therefore, the problem described at the beginning is not solved but only shifted into the stand, and the stand itself must be dimensioned for the high tensile forces. In the object of the invention, the known feature is retained that the said tensile forces are kept away from the machine stand. The machine stand can therefore be relatively light, since it need be designed essentially only for the dead weight of one of the two press rolls or of both press rolls.

In a first group of embodiments, the first press roll, which is supported on the stand, is located in the lower position and rests on the stand and that the second press roll is in the upper position. In this case, the support element of the second press roll rests—at least in the unloaded condition of the roll press—on the bearing pedestal of the first press roll. Since the tension bars are now mounted without substantial prestress, a distance results in the loaded condition of the roll press between the bearing pedestals. In this way, in the loaded condition of the roll press, the axial displaceability and inclinability of the one bearing pedestal relative to the other one is assured.

In another group of embodiments of the invention, the following is provided in the unloaded condition of the roll press: The two press rolls are supported independently of each other—similar to the case of the object of U.S. Pat. No. 4,503,765—in the machine stand. The bearing pedestal of the one press roll therefore preferably rests on a lower part of the stand and the bearing pedestal of the other press roll is suspended from an upper part of the stand so that a distance is always present between the supporting element and the bearing pedestal. Differing from U.S. Pat. No. '765, it is now provided, however, that in the loaded condition of the roll a transmission of force takes place by means of the tension bars directly from one bearing pedestal to the other. In this way the result is again obtained that (as already mentioned) the tension forces are kept away from the stand and that, at the same time, the bearing pedestals are movable relative to each other.

BRIEF DESCRIPTION OF THE DRAWINGS

Further advantages and developments of the invention will be explained below with reference to embodiments shown in the drawing, in which.

DESCRIPTION OF THE PREFERRED EMBODIMENTS

Figure 1:
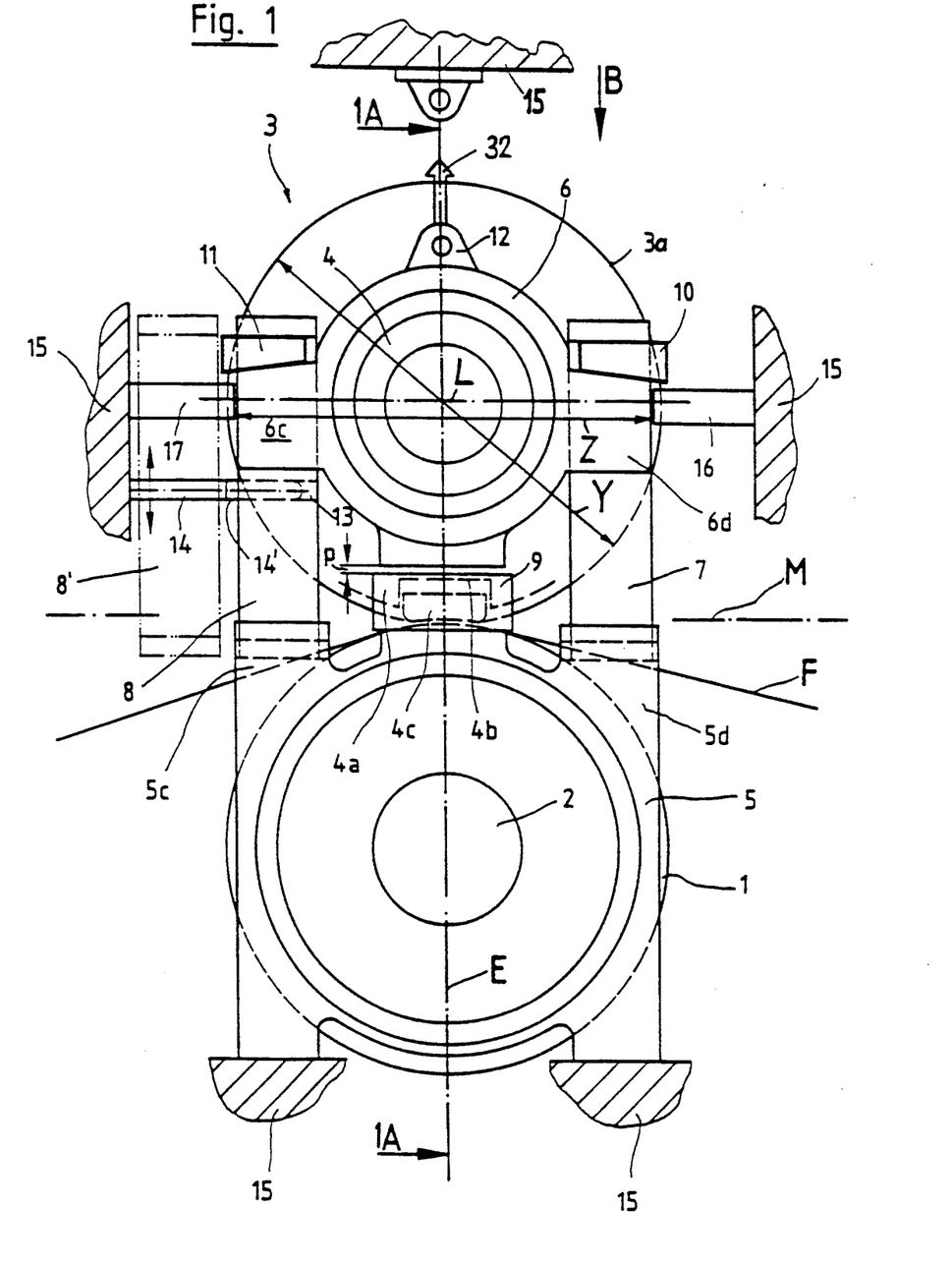
FIG. 1 is a side view of a roll press, seen in the direction of the arrow I in FIG. 1A.
Figure 1A:
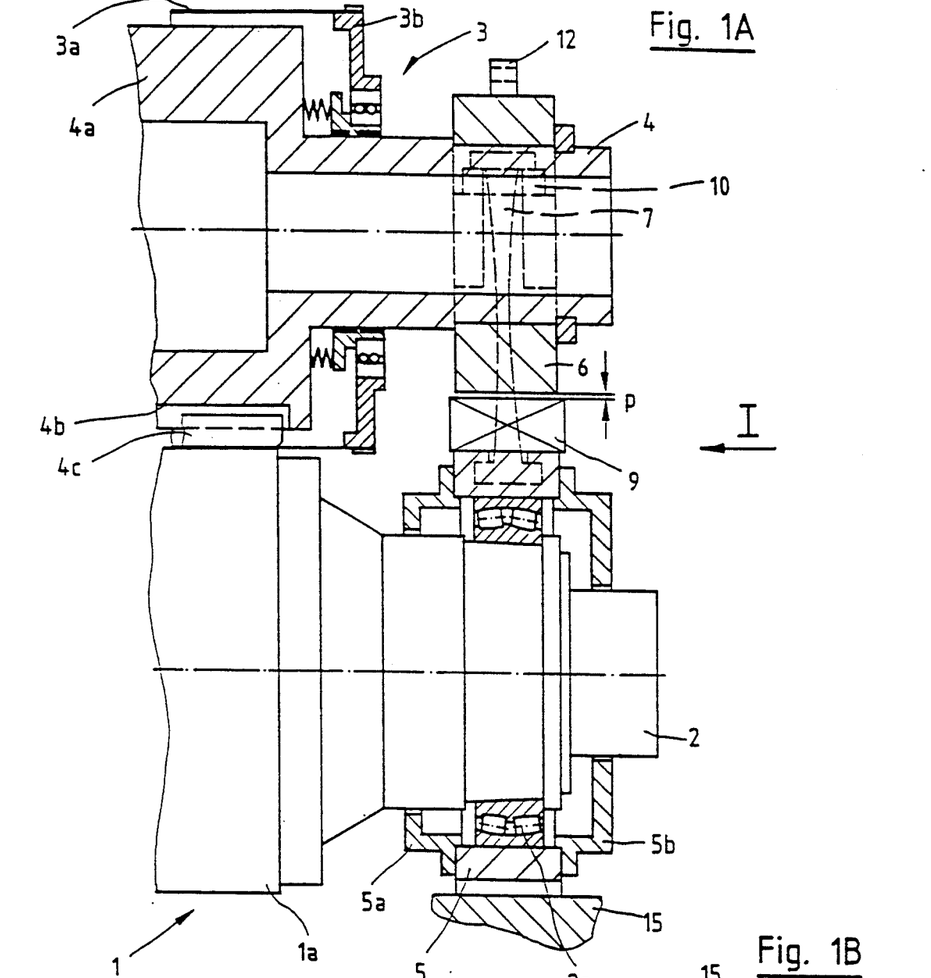
FIG. 1A is a longitudinal section along the line 1A—1A in FIG. 1 looking in the direction of arrows 1A.
Figure 1B:
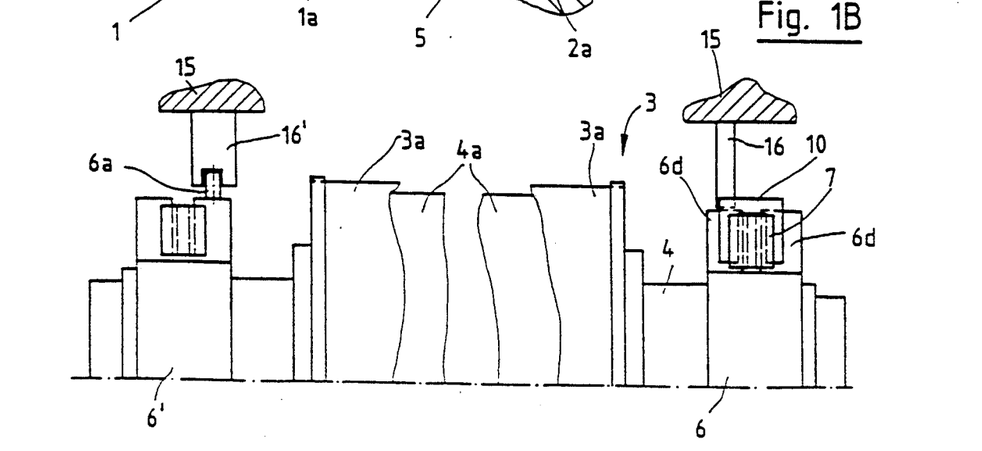
FIG. 1B is a partial view from above, seen in the direction of the arrow B in FIG. 1.

The roll press shown in FIGS. 1, 1A and 1B has a bottom first press roll 1 and a top second press roll 3. The principal axes of these press rolls (namely, the axes of rotation in the examples shown) lie in a press plane E. The first press roll 1 has a turnable roll shell 1A and a journal pin 2 fastened to it which rests, via an antifriction bearing 2a (preferably a self-aligning roller bearing), in a bearing pedestal 5 (with covers 5a and 5b). The bearing pedestal 5 rests on a frame-shaped machine stand 15, a few parts of which are shown in FIG. 1. The antifriction bearing 2a can be axially displaceable in the bearing pedestal 5 so as to permit a change in length (for instance, caused thermally) of the press roll 1. For this purpose it is, however, also possible to couple the bearing pedestal 5 in axially movable manner to the machine stand 15 (for instance, in accordance with U.S. Pat. No. '317, already mentioned above).

The upper, second press roll 3 is a so-called long-nip press roll. Its turnable roll shell 3a is a tubular flexible press shell which is fastened to two turnable shell support disks 3b. Each shell support disk rests on the stationary journal pin 4 of a stationary support body 4a which extends through the inside of the roll shell 3a. Differing from the showing, the axis of rotation of the roll shell 3a can be arranged eccentric with respect to the main axis of the support member 4a. The support member 4a has a recess 4b facing the lower press roll 1 and a piston-like, hydraulically actuatable press shoe 4c within it. Its concave slide surface presses the press shell 3a against the lower press roll 1 in order thereby to form a lengthened press nip (in direction of travel). A paper web from which the water is to be removed travels through it, together with at least one endless felt belt F. The upper press roll 3 rests (at each roll end) by means of the journal pin 4 in a bearing pedestal 6. Between the bearing pedestals 5 and 6 there is a removable intermediate piece 9 which lies on the bearing pedestal 5. The bearing pedestal 6 of the upper press roll 3 rests on said intermediate piece when the roll press is in its unloaded condition, i.e. when the recess 4b is without pressure. However, the drawing shows the loaded condition in which the press shoe 4c exerts a pressing force on the lower press roll 1. The forces of reaction resulting therefrom are transmitted to the bearing pedestal 5 from the bearing pedestal 6 by flexurally soft tension bars 7 and 8.

Figures 2, 3, 4:
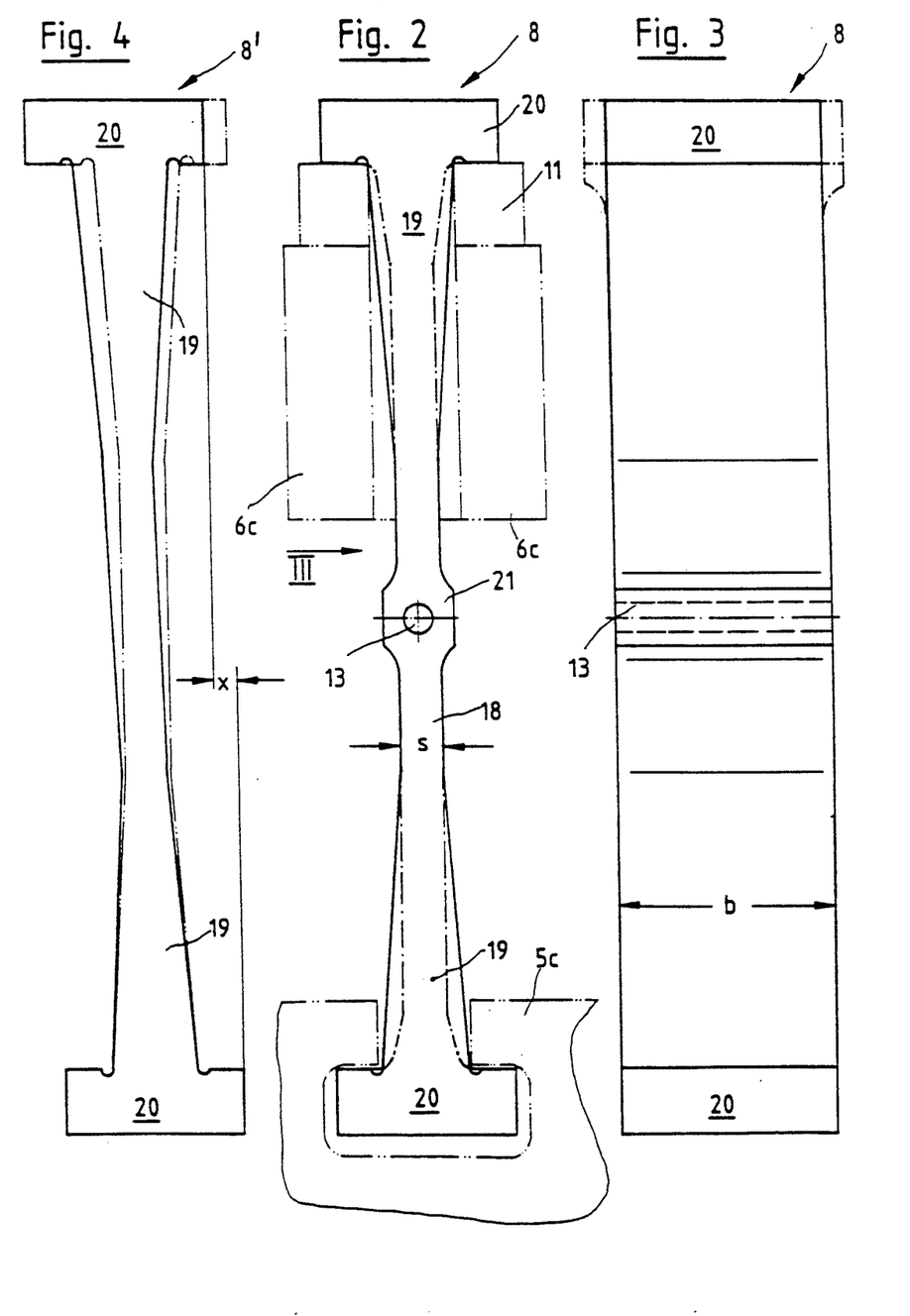
FIG. 2 shows an individual leaf-spring tension bar (on a scale about 3-times larger than in FIG. 1A)
FIG. 3 is a side view, seen in the direction of the arrow III in FIG. 2.
FIG. 4 shows a tension bar similar to that in FIG. 2, in deformed condition.

In accordance with FIG. 1, a flexurally soft tension bar 7, 8 is provided on each side of the press plane E. These tension bars are inserted from the side into recesses in the bearing pedestals 5 and 6 in the direction toward the press plane and are removed in the opposite direction out from the press plane. Each of the flexurally soft tension bars 7, 8 has a hammer head 20 on each of its ends and is preferably developed in the manner of a leaf spring, the so-called "leaf plane" of which is perpendicular to the press plane E. In this way, the tension bars 7, 8 can deform as shown in FIG. 4, if the support body 4, 4a of the second press roll 3 experiences a change in length (for example, caused by heat) and/or bends under the pressing force. Accordingly, the bearing pedestal 6 can be rigidly connected to the journal pin 4; the axial slide surface previously necessary between these two structural parts can be dispensed with, as can a spherical bushing. Due to a bending of the support member, journal pins 4 and bearing pedestal 6 are jointly inclined. In this connection it is important that only a single tension bar 7 and 8 respectively is provided on the two bearing pedestals, preferably in the center of the bearing pedestal 6' (see FIG. 1A).

In addition to the flexural softness of the tension bars, however, the following requirement must also be satisfied in order to assure easy axial displaceability and/or inclinability of the bearing pedestal 6 (in case of a change in the length or bending of the support member 4, 4a): In the unloaded condition of the roll press, the tension bars 7, 8 are either not prestressed at all or only very slightly prestressed. As a result, the bearing pedestal 6 of the upper press roll 3, in the loaded condition of the roll press, lifts off slightly from the intermediate piece 9. In other words, play p is established between the bearing pedestals 5 and 6. The amount of this play can be determined in the manner that a U-shaped wedge 10, 11 is pushed to a greater or lesser extent at each of the tension bars 7, 8 between the hammer head 20 and the support element 6. If necessary, the tension bars 7, 8 can be placed under a slight initial stress in the unloaded condition of the roll press by means of these wedges.

The introduction of a new endless felt belt F into the roll press is effected, of course, in the unloaded condition, namely from one end of the roll, in the direction indicated by the arrow I in FIG. 1A. In this connection, therefore, the upper press roll initially rests on the intermediate piece 9. The wedges 10, 11 are first removed at both ends of the roll and then the tension bars 7, 8. The upper press roll 3 is now lifted by means of a hoist (symbolically indicated by arrow 32) acting on the lugs 12, the intermediate piece 9 is removed, and the endless felt belt F is introduced. Thereupon the intermediate piece 9 is again inserted and the press roll 3 placed thereon, whereupon the tension bars 7, 8 and the wedges 10, 11 are again mounted. This work can be done within a relatively short period of time as compared with the time expended in the previous constructions. The same procedure is carried out in order to replace the flexible roll shell 3a by a new one.

FIGS. 2 and 3 show further details of a flexurally soft tension bar 8, also referred to as an "I-bar." In order that it can transmit the greatest possible tensile forces and, at the same time, elastically follow the above-described displacements of the bearing pedestal 6, the tension bar 8 has a thickness which is varied in optimized manner over its length as follows: the tension bar 8 has a middle section 18 of smaller thickness s, similar to a leaf spring. This middle section 18 (lying in the so-called "leaf plane" is connected to the hammer heads 20 (according to FIGS. 1A and 2, 4) by wedge-shaped intermediate sections 19. Instead of the wedge-shaped intermediate sections, rounded transitions can also be provided. The width b of the tension bar 8 is the same (looking onto the front side of the press rolls 1, 3) over its entire length; see FIG. 1 and the shape shown in solid line in FIG. 3. Differing from this, at least one of the heads 20 can have an even greater width, as indicated by dash-dot lines in FIG. 3. In each case, the width b is several times greater than the thickness s, so that extremely high tensile forces can be transmitted. At the same time, the tension bar 8 is extremely flexurally elastic, the flexibility of the tension bar being several times greater transverse to the leaf plane than in the leaf plane itself. Thus, strong deformations of the tension bar in the direction of the principal axes are possible.

FIG. 4 shows this flexibility on the example of the tension bar 8'; in this case, a displacement of the one hammer head 20 with respect to the other by the amount x has taken place. The contour shown in solid line corresponds approximately to the shape which the I-bar assumes under maximal elastic deformation as compared with its original shape, which is indicated by the dash-double-dot lines. In this connection, the bend is concentrated primarily on the transition zones from the middle section 18 to the wedge-shaped sections 19.

The length of the middle section 18 can be about one third (FIG. 2, solid lines) to about 9/10 (FIG. 2, dash-dot lines) of the total length of the tension bar 8. In the wedge-shaped intermediate sections 19, the thickness of the tension bar 8 increases continuously to 1.5 to 3 times the thickness s of the middle section 18.

The length of the flexurally soft tension bars 7, 8 is at least half a meter and in the case of large roll presses, however, preferably 0.7 to 1.5 m. In FIG. 1, a central plane extending perpendicular to the press plane E and through the press nip is designated M. On the bearing pedestal 5 there are developed arms 5c and 5d which extend in the direction of the plane M of the press nip. In each arm there is a T-groove which is open towards the top to receive one of the tension bars 7, 8. The bearing pedestal 6 has on each side, approximately at the height of the central plane L (in which the axis of rotation of the roll lies) two arms 6c and 6d and, between them, a slot, again in order in each case to receive one of the tension bars 7, 8.

The cross section and material of the tension bars are so selected that the so-called yield point of the tension bar is reached when the normal maximum pressing force of the roll press is exceeded by about 50 to 100% as the result of a disturbance, for instance should a foreign body enter the press nip. In other words, the tension bar forms a place of intended breakage which prevents greater damage in the event of a disturbance.

The installation and removal of flexurally soft tension bars 7, 8 can be effected by hand in the case of smaller roll presses, or with the use of a conventional lifting mechanism, for instance a pedestal and pulley or pneumatic cylinder, in the case of larger roll presses. For further accelerating the installation and removal of the tension bars 7, 8, the following can, however, be provided, as shown on the example of the tension bar 8 in FIGS. 1 and 3: in the center of the middle section 18 there is provided a thickening 21 through which a transverse hole 13 extends. This hole extends in the direction in which the tension bar 8 is inserted into the recesses in the bearing pedestals 5 and 6. On the machine stand 15 there is provided a bolt 14 which extends into the transverse hole 13. The bolt 14 serves as slide path for the tension bar 8 upon its introduction and removal. After the moving out of the tension bar 8 it is in the position designated 8' (FIG. 1). Here, the tension bar 8' can be swung by about 90° in order to facilitate the introduction of the new endless felt belt F. It may be advisable to support the bolt 14 for vertical displacement on the stand 15, as symbolically indicated by the double-ended arrow. The outer end 14' of the bolt can be unscrewed in order to permit the axial installing and removal of the upper press roll 3 (or merely of the press shell 3a).

The thickening 21 with hole 13 and the bolt 14 can also be dispensed with in the case of large tension bars (FIGS. 4 and 7), in the manner that an individual tension bar (for instance, 8') is divided into several individual tension bars 8a, 8b and 8c. Together they form a tension-bar group 8'. The width of each individual tension bar 8a, 8b, 8c is only a fraction (for instance, a third) of the width b of the entire tension-bar group 8'. In order to secure the position of the divided tension bars, fixed stops 5e, 6e are provided in the inner region and removable stops 5f, 6f in the outer region (shown only on the one tension-bar group 7').

FIG. 1 shows a centrally arranged intermediate piece 9. Instead of this, intermediate pieces could also be arranged on the tension bars 7 and 8; they could be fastened to the tension bars, for instance, by screws.

The bearing pedestal 6 of the upper press roll 3 is guided parallel to the press plane E by means of removable jaws 16 and 17 which are fastened on the machine stand 15. Similar jaws 16' (FIG. 1B) are located on the other end of the roll. All of these jaws see to it that the principal axis of the upper press roll 3 always remains parallel to the principal axis of the lower press rolls 1. The jaws 16' arranged on the other end of the roll have the additional task of fixing the position of the upper press roll in axial direction, for instance in the manner that the jaw 16' grips around a ledge 6a arranged on the support element 6' (FIG. 1B).

In order that, in the case of the long-nip press roll 3, the aforementioned replacement of the flexible roll shell 3a (after the removal of the tension bars 7 and 8 as well as of the intermediate piece 9 and the jaws 16 and 17) can be effected without difficulty, the following is provided: In accordance with FIG. 1 or 7, the arms 6c, 6d of the bearing pedestal 6 of the long-nip press roll 3 do not extend beyond the path of travel of the roll shell 3a. Thus, the press shell 3a can be pulled away over the bearing pedestal 6; the latter, therefore, need not be removed. During the change in shell, the end of the long-nip press roll 3 visible in FIG. 1A can be lifted in known manner by an auxiliary device which is fastened to the pin 4. Due to the fact that, as already mentioned, the arms 6c and 6d lie within the path of travel of the roll shell 3a, it is characteristic for the invention that the distance Z between the outsides of the tension bars 7 and 8 is less than the diameter Y of the long-nip press roll 3. In general, it can be said that said distance Z is smaller, or at most very slightly greater than the diameter Y of the larger of the two press rolls 1 and 3. This is true regardless of which of the two press rolls has the larger diameter and regardless of whether one of the two press rolls is developed as long-nip press roll or not.

The roll press shown in FIGS. 1, 1A and 1B is—due to the radially movable press shoe 4c—a so-called self-loading roll press (in other words: a press with inner pressing device). The invention can also be employed if, instead of the long-nip press roll 3, a press roll of adjustable sag is provided, for instance one in accordance with U.S. Pat. No. 4,691,421. This is also a press roll with an inner pressing device. Other roll combinations are, however, also conceivable, including ones with outer pressing device, for instance in accordance with U.S. Pat. No. 4,796,452. In this connection, two normal press rolls (i.e. two with rotatable roll pins) can also be used in a roll press in accordance with the invention.

Figure 5:
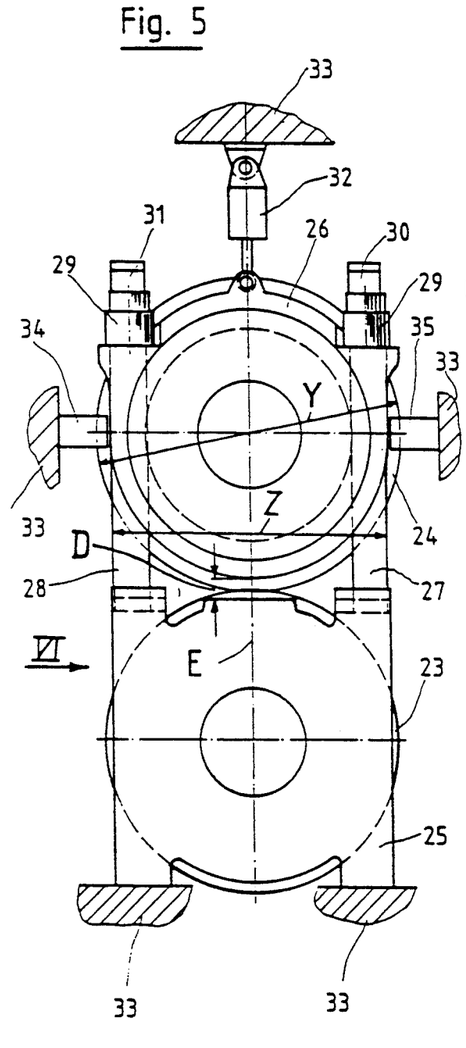
FIG. 5 is a side view of another embodiment of the invention.
Figure 6:
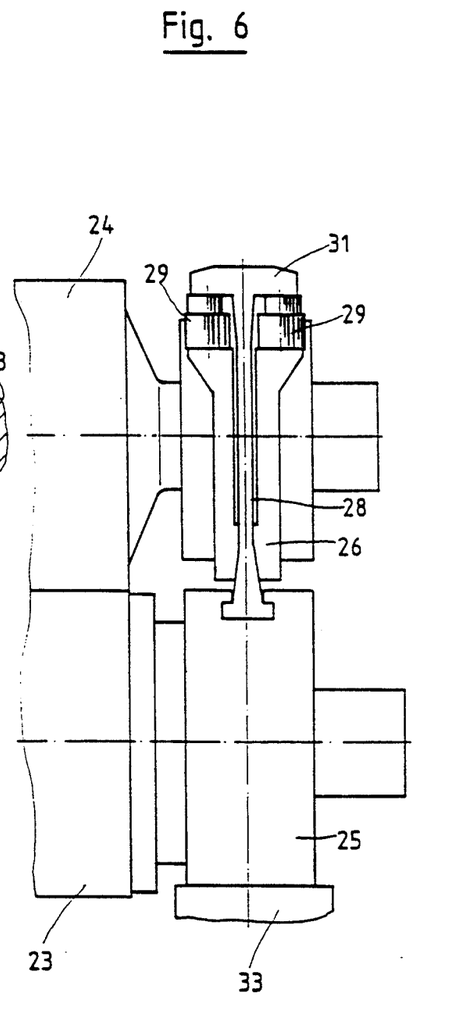
FIG. 6 is a view seen in the direction of the arrow VI in FIG. 5.

Another roll press in accordance with the invention which has an outer pressing device is shown in FIGS. 5 and 6. Here, the first, bottom press roll is designated 23 and the second, top press roll 24. These may be two normal press rolls (i.e. both with rotatable journal pins). At least one of the two press rolls, however, can also be developed as a sag-adjustment roll without internal pressing device, preferably in accordance with U.S. Pat. No. 4,414,890. The lower press roll 23 again rests in a bearing pedestal 25 which is arranged on a machine stand 33 (rigidly or displaceably). The upper press roll 24 rests in a bearing pedestal 26 which is vertically movable, a variable distance D being always present between the bearing pedestals 25 and 26. The bearing pedestals 25 and 26 are again connected by flexurally soft tension bars 27, 28, but now with the interpositioning of hydraulic cylinders 29 which exert a pressing action. These cylinders are arranged on the bearing pedestal 26 and press against enlarged hammer heads 30, 31 of the tension bars 27, 28 (again developed in the form of leaf springs).

The force of the hydraulic cylinder 29 produces the pressing force between the two press rolls 23 and 24. Another hydraulic cylinder 32 which exerts a pulling action and is pivoted to the frame-shaped stand 33 holds the upper press roll 24 when the tension bars 27, 28 are removed. The hydraulic cylinder 32 can then lift the press roll 34 further in order to create a sufficiently large space between the press rolls so that a new endless felt belt can be introduced. Guide jaws 34, 35 again see to the centering of the upper press roll 24 in the press plane E. The lift cylinder 32 forms a resilient connection of the bearing pedestal 26 to the stand 33. In accordance with FIG. 5, the distance Z between the outsides of the two tension bars 27 and 28 is again less than the diameter Y of the larger of the two press rolls; in this case, this is the press roll 24. In this way, the press roll 24 can be replaced at any time by a long-nip press roll 3 in accordance with FIGS. 1, 1A and 1B. In this case, the bearing pedestal 25 of the lower press roll 23 can remain unchanged. As seen, this bearing pedestal 25 has exactly the same shape as the bearing pedestal 5 of FIG. 1.

Figure 7:
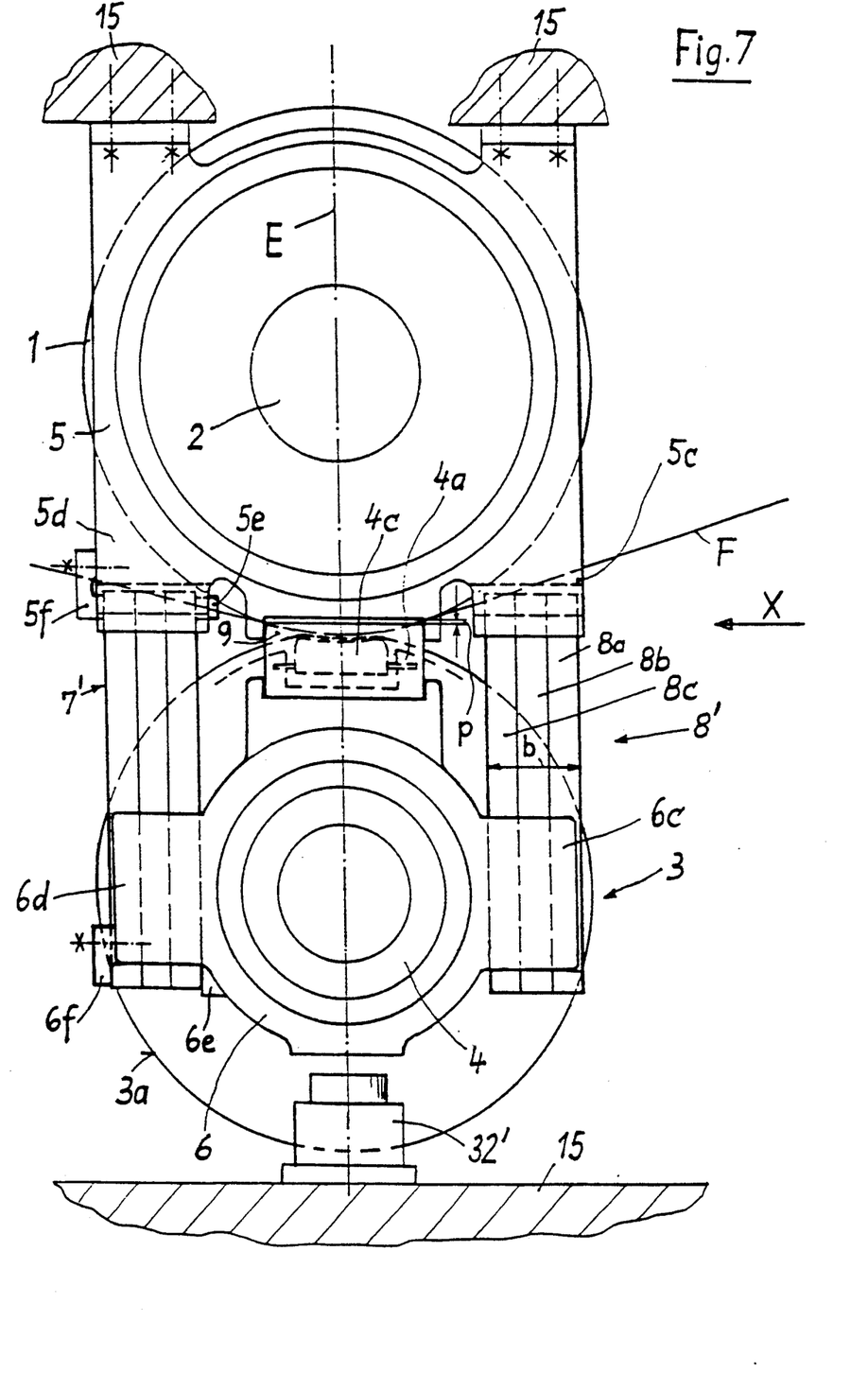
FIG. 7 is the side view of another embodiment, which differs from FIG. 1.

Further embodiments of the invention result if the variants shown are turned upside-down. FIG. 7 shows such an example. In that case, the roll press in accordance with FIG. 1 is turned 180°; i.e., the press roll 1 is suspended from the upper part of the machine stand 15 in the manner (for instance) that the bearing pedestal 5 is screwed to the machine stand 15. Furthermore, the long-nip press roll 3 (at least at the end visible in FIG. 7) hangs by means of the tension bars 7' and 8' from the bearing pedestal 5 of the upper press roll 1. The tension bars (for instance, 8'), as already mentioned, are divided into individual tension bars 8a to 8c arrayed outward from the press plane.

Between the two bearing pedestals 5 and 6 there is again a removable intermediate piece 9. Differing from FIG. 1, this intermediate piece 9 now serves primarily for the centering of the two bearing pedestals 5 and 6 with respect to each other so that the jaws 16 and 17 of FIG. 1 can be dispensed with. It can be noted that even in the unloaded condition of the roll press a small distance p is present between the upper bearing pedestal 5 and the intermediate piece 9. For the removal of the tension bars 7' and 8', the lower bearing pedestal 6 can be lifted by a lifting device 32' which is arranged on the lower stand part 15. The lifting device is developed as a hydraulic cylinder acting by pressure. The U-shaped wedges 10 and 11 of FIG. 1 are omitted in FIG. 7 since they can be dispensed with.

Another embodiment different from FIG. 1 is not shown in the drawings; however, it is similar to FIG. 7. In accordance therewith, the long-nip press roll 3 is again arranged below the normal press roll 1; its bearing pedestals 6, however are now on the lower part of the machine stand 15. The bearing pedestal 5 of the normal press roll 1 is not suspended from the stand 15 but rests (in unloaded condition of the roll press) on the intermediate member 9. Once again, the bearing pedestals 5 and 6 are coupled to each other by flexurally soft tension bars 7 and 8 so that, again, mobility of the upper bearing pedestal 6 relative to the lower bearing pedestal 5 is assured.

Figure 8:
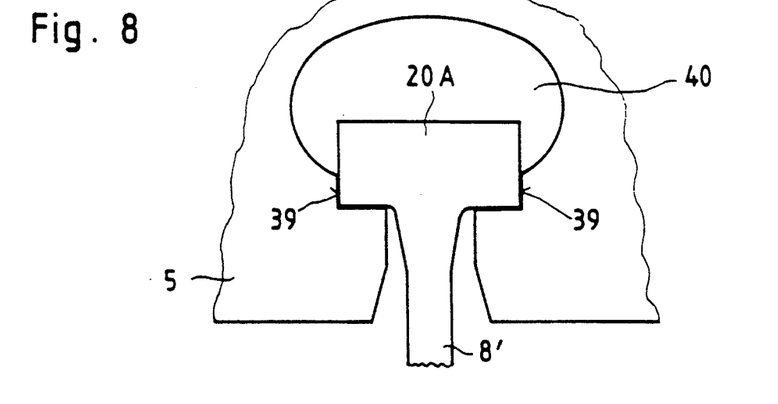
FIGS. 8 to 10 show different shapes of tension bars in an enlarged partial view, seen in the direction of the arrow X in FIG. 7.
Figure 9:
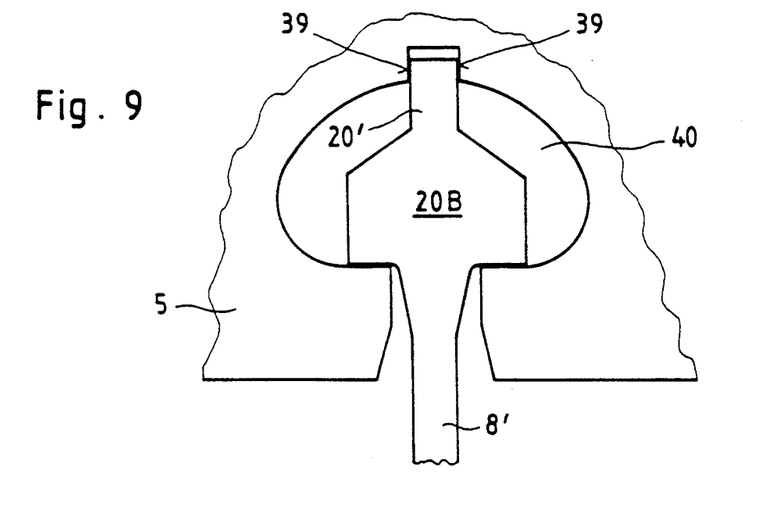
Figure 10:
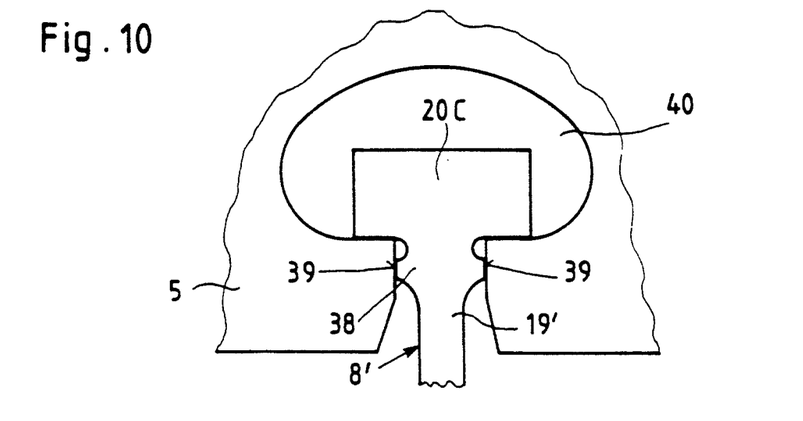

From FIGS. 8 to 10 it can be seen that the T-groove (40) in the bearing pedestal 5 (for instance FIG. 7) may have a special rounded shape in order to transmit the high tensile force introduced by the tension bar 8 as dependably as possible into the other part of the bearing pedestal. Stated more precisely: the part of the T-groove 40 surrounding the head 20A or 20B or 20C of the tension bar 8' has a predominantly round cross section. In order that the head of the tension bar 8' (despite the deformation of the tension bar shown in FIG. 4) is fixed with the greatest possible reliability in the T-groove, two support surfaces 39 are provided on the tension bar, they lying substantially parallel to the longitudinal axis of the tension bar and substantially perpendicular to the press plane E (FIG. 7). These support surfaces are in contact with mating support surfaces which are provided on the bearing pedestal 5. In accordance with FIG. 8, the support surfaces 39 are provided directly on the head 2A; in other words, the support surfaces 39 are formed by the end surfaces on the two sides of the head 20A. In accordance with FIG. 9, the support surfaces 39 are provided on an extension 20, of the head 20B. In accordance with FIG. 10, the support surfaces 39 are provided on a thickening 38 of the intermediate section 19'. The thickening 38 is only at a slight distance from the head 20C. The transitions from the thickening 38 to the head 20C are developed as grooves of semicircular cross section.

I claim:

1. A roll press comprising:
   a first press roll having a first axis and a periphery; the first press roll having an individual first end at each of its opposite ends; one of said first ends being axially spaced in a first direction from another of said first ends;
   a second press roll having a second axis and a periphery; the second press roll having an individual second end at each of its opposite ends; one of said second ends being axially spaced in said first direction from another of said second ends;
   the first and the second rolls being oriented so that the first and second axes define a press plane and so that the roll peripheries cooperate to form a press nip;
   a pressing device adapted to load and unload the roll press;
   a first bearing pedestal located at and supporting said one of the first ends of the first press roll;
   a second bearing pedestal located at and supporting said one of the second ends of the second press roll; the second pedestal being movable relative to the first pedestal in the press plane;
   at least one tension bar extending between the first and the second bearing pedestals and extending substantially parallel to the press plane and perpendicular to the first and second press roll axes; the tension bar having little tension when the roll press is in an unloaded condition; the tension bar being deformable for enabling relative movement of the first and second pedestals parallel to the press plane when the roll press is in a loaded condition.

2. The roll press of claim 1, wherein the tension bar is detachable from at least one of the pedestals.

3. The roll press of claim 2, further comprising means in the first and the second pedestals for detachably receiving the tension bar, such that the tension bar may be installed in and removed from the pedestal generally toward and away from the press plane.

4. The roll press of claim 3, wherein the tension bar is generally a leaf spring, the leaf spring having a leaf plane which is generally perpendicular to the press plane, the tension bar when installed being several times more flexible in a plane parallel to the press plane than it is perpendicular to the press plane.

5. A roll press comprising:
   a first press roll having a first axis and a periphery; the first press roll having an individual first end at each of its opposite ends; one of said first ends being axially spaced in a first direction from another of said first ends;
   a second press roll having a second axis and a periphery; the second press roll having an individual second end at each of its opposite ends; one of said send ends being axially spaced in said first direction from another of said second ends;
   the first and the second rolls being oriented so that the first and second axes define a press plane and so that the roll peripheries cooperate for form a press nip;
   a pressing device adapted to load and unload the roll press;
   a first bearing pedestal located at and supporting said one of the first ends of the first press roll;
   a second bearing pedestal located at and supporting said one of the second ends of the second press roll; the second pedestal being movable relative to the first pedestal in the press plane;
   first and second tension bars extending between the first and the second pedestals, each tension bar being on one respective side of the press plane, each tension bar extending substantially parallel to the press plane and perpendicular to the first and second axes; each tension bar having little tension when the roll press is in an unloaded condition; each tension bar being movable for enabling relative movement of the first and second pedestals when the roll press is in a loaded condition;

the first and the second press rolls having respective first and second diameters;

the tension bars having respective outer sides that face away from one another, and the tension bars being so shaped, sized and located that for a roll press construction in which one of said first and second diameters is sized differently than the other of said first and second diameters, the outer sides of the tension bars are spaced apart by a distance that is at most substantially the same size as the larger one of the first and the second diameters.

6. The roll press of claim 5, further comprising a stand supporting the first bearing pedestal.

7. The roll press of claim 5, wherein the first and the second press rolls have respective journal pins which are received on the respective first and second pedestals, and the rolls being supported on the pedestals by the respective journal pins thereof.

8. The roll press of claim 5, wherein each press roll includes a rotatable roll shell on which the respective periphery is defined, and the respective roll shell peripheries meet at the press nip as the roll shells rotate.

9. The roll press of claim 5, wherein the first press roll comprises a long nip press roll, which includes a tubular flexible roll shell, a support inside the roll shell and a pressable shoe on the support and inside the roll shell and movable in the press plane toward and away from the second press roll;

the distance between the outer sides of the tension bars outward of the press plane being less than the diameter of the long nip press roll.

10. The roll press of claim 9, wherein the first bearing pedestal includes two arms, one arm for each of the tension bars, and in a cross section across the first axis of the first press roll, the two arms of the first pedestal being substantially within the path of travel of the roll shell.

11. The roll press of claim 5, wherein the tension bar is flexurally soft for being flexible particularly parallel to said press plane.

12. The roll press of claim 11, wherein each tension bar includes opposite ends operatively engaged with the first and second pedestals, respectively, retaining means at said opposite ends for retaining the tension bars operatively engaged with the first and the second pedestals, respectively while tension is applied to the tension bars.

13. The roll press of claim 12, wherein the retaining means comprise a respective head at each end of the tension bar, and comprise a retaining slot in the respective pedestals for the respective tension bar head.

14. The roll press of claim 13, wherein each tension bar head is of a shape generally resembling that of a hammerhead.

15. The roll press of claim 12, further comprising means in the first and the second pedestals for detachably receiving the tension bar in a manner such that the tension bar may be installed in and removed from the pedestal generally toward and away from the press plane.

16. The roll press of claim 15, wherein the tension bar is generally a leaf spring, the leaf spring having a leaf plane which is generally perpendicular to the press plane, and the tension bar when installed being several times more flexible in a plane parallel to the press plane than it is perpendicular to the press plane.

17. The roll press of claim 12, wherein the first press roll comprises a long nip press roll, including a tubular flexible roll shell, a support inside the roll shell and a pressable shoe on the support and inside the roll shell and movable in the press plane toward and away from the second press roll;

the distance between the outer sides of the tension bars outward of the press plane being less than the diameter of the long nip press roll.

18. The roll press of claim 17, wherein the length of each tension bar is at least 0.5 meters.

19. The roll press of claim 18, wherein the length of each tension bar is in the range of 0.7 to 1.5 meters.

20. The roll press of claim 17, wherein the long nip press roll has a central plane that extends through the axis of the long nip press roll and is perpendicular to the press plane;

the tension bar ends located at the first pedestal having first retaining means which are close to the central plane of the first press roll;

the tension bars ends located at the second pedestal having second retaining means which are close to the plane of the press nip, and the plane of the press nip being perpendicular to the press plane and also extending through the press nip.

21. The roll press of claim 20, wherein the first pedestal includes respective slots therein for receiving the first ends of the tension bars, and the second pedestal includes T-shaped grooves therein for receiving the second ends of the tension bars.

22. The roll press of claim 20, further comprising a stand supporting the first bearing pedestal;

the bearing pedestals being so shaped and placed, and the tension bars being of such lengths, that there is always a gap between the first and the second pedestals;

a lift device connecting the second pedestal with the stand.

23. The roll press of claim 12, wherein each tension bar is comprised of a plurality of tension bar sections which are arranged side by side outward from the press plane to together define each of the tension bars.

24. The roll press of claim 12, wherein the second press roll and the second pedestal are arranged above the first press roll and the first pedestal, such that in the unloaded condition of the roll press, the second pedestal rests on the first pedestal, while in the loaded condition of the roll press, the tension bars engage the pedestals while enabling play to be established between the first and the second pedestals.

25. The roll press of claim 12, further comprising a stand supporting the first bearing pedestal;

the first press roll and the first pedestal being arranged above the second press roll and the second pedestal and the first press roll being suspended from the stand, and the tension bars supporting the second pedestal suspended from the first pedestal.

26. The roll press of claim 12, further comprising a removable intermediate piece between the first and the second pedestals.

27. The roll press of claim 12, further comprising a lift device for lifting the press roll that is above relative to the press roll that is below.

28. The roll press of claim 12, wherein said second pedestal comprises an individual second pedestal section at each end of the second press roll;

said roll press further comprising first guide means defining vertical slide paths for one of the second pedestal sections to move in the press plane;

second guide means for guiding another of the second pedestal sections for movement only vertically.

29. The roll press of claim 28, wherein the second guide means comprise stationary guide jaws for guiding the another of the second pedestal sections.

30. The roll press of claim 12, further comprising a hydraulic lift cylinder connected with each tension bar for acting on the tension bars to move the tension bars for relatively moving the pedestals.

31. The roll press of claim 12, wherein one of the pedestals includes a T-shaped groove therein including a head portion located toward the end of the groove, the tension bar including a head and the head of the tension bar extending into the head portion of the groove, while the tension bar passes through the groove, for retaining the tension bar in the groove.

32. The roll press of claim 31, wherein the head portion of the T-shaped groove which surrounds the head of the tension bar has an at least predominantly round cross-section.

33. The roll press of claim 11, wherein the tension bar is generally a leaf spring, the leaf spring having a leaf plane which is generally perpendicular to the press plane, and the tension bar when installed being several times more flexible in a plane parallel to the press plane than it is perpendicular to the press plane.

34. The roll press of claim 33 and a stand supporting the roll press; between the ends of the tension bar, the tension bar having a hole defined herein extending toward the press plane; a bolt supported on the stand and extending into the hole in the tension bar for enabling movement of the tension bar along the bolt to removabley secure and operatively position the tension bar relative to the pedestals.

* * * * *